(12) United States Patent
Hua et al.

(10) Patent No.: US 7,430,720 B2
(45) Date of Patent: Sep. 30, 2008

(54) SYSTEM AND METHOD FOR PREVENTING SCREEN-SCRAPERS FROM EXTRACTING USER SCREEN NAMES

(75) Inventors: Morgan Hua, Sunnyvale, CA (US); Jai Rawat, Sunnyvale, CA (US)

(73) Assignee: America Online, Inc., Dulles, VA (US)

( * ) Notice: Subject to any disclaimer, the term of this patent is extended or adjusted under 35 U.S.C. 154(b) by 721 days.

(21) Appl. No.: 10/636,461

(22) Filed: Mar. 5, 2004

(65) Prior Publication Data

US 2005/0198580 A1    Sep. 8, 2005

(51) Int. Cl.
*G06F 3/00* (2006.01)
(52) U.S. Cl. .................... 715/753; 715/758
(58) Field of Classification Search ............. 715/753
See application file for complete search history.

(56) References Cited

U.S. PATENT DOCUMENTS

| | | | |
|---|---|---|---|
| 5,793,365 A * | 8/1998 | Tang et al. ............... 715/758 |
| 6,052,709 A | 4/2000 | Paul ........................... 709/202 |
| 6,167,426 A | 12/2000 | Payne et al. ................ 709/200 |
| 6,324,569 B1 | 11/2001 | Ogilvie et al. .............. 709/206 |
| 6,336,133 B1 | 1/2002 | Morris et al. ............... 709/204 |
| 6,366,950 B1 | 4/2002 | Scheussler et al. .......... 709/206 |
| 6,430,602 B1 | 8/2002 | Kay et al. ................... 709/206 |
| 6,480,885 B1 | 11/2002 | Olivier ....................... 709/207 |
| 6,487,586 B2 | 11/2002 | Ogilvie et al. .............. 709/206 |
| 6,539,421 B1 * | 3/2003 | Appelman et al. .......... 709/206 |
| 6,721,410 B1 * | 4/2004 | Will ......................... 379/202.01 |
| 6,732,146 B1 * | 5/2004 | Miyake ....................... 709/204 |
| 6,779,178 B1 * | 8/2004 | Lloyd et al. ................. 717/174 |
| 6,781,608 B1 * | 8/2004 | Crawford .................... 715/758 |
| 6,990,452 B1 * | 1/2006 | Ostermann et al. .......... 704/260 |
| 7,007,235 B1 * | 2/2006 | Hussein et al. .............. 715/751 |
| 2001/0020956 A1 * | 9/2001 | Moir ........................... 345/765 |
| 2004/0041818 A1 * | 3/2004 | White et al. ................ 345/619 |
| 2004/0148346 A1 * | 7/2004 | Weaver et al. .............. 709/204 |
| 2004/0179039 A1 * | 9/2004 | Blattner et al. ............. 345/758 |
| 2005/0004993 A1 * | 1/2005 | Miller et al. ................ 709/207 |
| 2005/0030937 A1 * | 2/2005 | Wick et al. ................. 370/352 |
| 2006/0041848 A1 * | 2/2006 | Lira ........................... 715/805 |

FOREIGN PATENT DOCUMENTS

JP        2001350706 A    * 12/2001

OTHER PUBLICATIONS

Ahn et. al., "Telling Humans and Computers Apart Automatically" by Luis von Ahn, Manuel Blum, and John Langford; ACM, vol. 47, No. 2, Feb. 2004, pp. 57-60.*

Ahn et al., "CAPTCHA: Using Hard AI Problems For Security", Eurocrypt, May 6, 2003, Warsaw.*

(Continued)

*Primary Examiner*—Rachna Singh
*Assistant Examiner*—Gregory A Distefano
(74) *Attorney, Agent, or Firm*—Michael A. Glenn; Glenn Patent Group

(57) ABSTRACT

Graphic screen names are used instead of using text screen names in a Web chat room or an instant messaging system so that screen scrapers cannot generate an e-mail list for spam by extracting the screen names from the Web chat room or instant messaging system.

12 Claims, 5 Drawing Sheets

OTHER PUBLICATIONS

"MySpace", Wikipedia.com, the free encyclopedia; discusses the history of MySpace.com, as well as its ability to display an image set by the user automatically with every comment they leave.*

Archive of www.cooltext.com, published Feb. 16, 2003, p. i, ii, 1-3.*

"MySpace", Wikipedia.com, the free encyclopedia; dicusses the history of MySpace.com, as well as its ability to display an image set by the user automatically with every comment they leave. Published Feb. 11, 2005.*

*Graphical Comparison Of Components With Feature Interactions*; C. Prehofer; DoCoMo Euro Labs, Munich, Germany, Published 2002.

*A Knowledge Based Scene Analysis System For The Generation Of 3-D Models*; O. Grau; 5th Int. Conf. On Intelligent Systems; Jun. 19-21, 1996.

*A Bayesian Approach To Filtering Junk E-Mail*; M. Sahami, Stanford University, Computer Science Department; S. Dumais, D. Heckerman, E. Horvitz; Microsoft Research, Published 1998.

*XML's Impact On Databases And Data Sharing*; L. Seligman, A. Rosenthal; IEEE; Jun. 2001.

* cited by examiner

Account Information

| | | |
|---|---|---|
| E-mail Address | John Doe | @hotmail.com |
| Password Six-character minimum; no spaces | •••••••••• | |
| Retype Password | •••••••••• | |
| Secret Question | Favorite movie? | |
| Secret Answer | Tytanic | |
| Services | ☑ Hotmail Member Directory | |
| | ☑ Internet White Pages | |
| | Use these check boxes to indicate whether you'd like to be listed in these Internet directories. More information about directories | |
| Registration Check | Type the characters that you see in this picture. Why? | |

101 — HA2WJ A R5

102 — I can't see this picture.

HA2WJAR5

Characters are not case-sensitive.

FIG. 1

- Prior Art -

- Prior Art -

SYSTEM AND METHOD FOR PREVENTING SCREEN-SCRAPERS FROM EXTRACTING USER SCREEN NAMES

BACKGROUND OF THE INVENTION

1. Field of the Invention

This invention generally relates to Internet anti-spam technology. More particularly, the invention relates to a system and method for preventing an automated process from extracting users' screen names or e-mail addresses from a chat room or an instant messaging service where a communication screen is viewed by a plurality of users.

2. Description of the Prior Art

Spam usually refers to unsolicited e-mail documents consisting of advertising materials for the lease, sale, rental, gift offer or other disposition of any realty, goods, services or extension of credit when the documents (a) are addressed to recipients who do not have existing business or personal relationships with the initiator, and (b) were not sent at the request of or with the consent of the recipient. An unsolicited e-mail is not necessarily a spam, but all spam is unsolicited.

Spam has become ubiquitous. It is estimated that thirty six percent of all e-mails sent on a given day consists of unsolicited e-mails, otherwise known as "spam". Most people see spam as the scourge of e-mail. On the low end, spam is simply annoying. On the high side, spam is expensive to eliminate and those costs are usually passed on to the consumers. Hence more and more people look for ways to stop it from infecting their e-mail boxes. However, until strong anti-spam laws are passed and actually enforced, spam proliferation would continue because it is a very effective way to reach a mass audience at one time at little or no cost to the sender.

Spam proliferation is harmful to both Internet service providers (ISPs) and consumers. ISPs incur significant business-related costs accommodating bulk mail advertising and answering consumer complaints. Recipients of spam expend resources to sort, read and discard unwanted junk e-mails. If an employee undertakes this exercise at work, the employer also suffers the financial consequences of the wasted time. It is estimated that five man-weeks are wasted for each million recipients who spend just one second to delete an unsolicited e-mail.

In addition to wasting recipients' time with unwanted e-mail, spam also eats up a lot of network bandwidth. Consequently, many organizations and individuals have taken it upon themselves to fight spam with a variety of techniques. Because the Internet is public, there is really little that can be done to prevent spam, just as it is not easy to prevent regular junk mail. However, some online services have instituted policies to prevent spammers from spamming their subscribers.

Spammers need e-mail addresses as much as possible. E-mail collectors collect e-mail addresses and sell their list to spammers who look for e-mail addresses. There are many ways to collect e-mail addresses. The primitive way is to collect manually from advertisements, newspapers, business-cards, or other resources available to the public. Many offline stores even ask their customers to provide their e-mail addresses in exchange for discounts or free merchandise.

Various automated methods for collecting e-mail addresses have been developed. In one of these methods, a program is run to troll the Internet looking for e-mail addresses, much like throwing a net in the ocean and seeing what gets caught in it. Another method is to use a program to screen-scrape a chat room or instant messaging service where a communication screen is viewed by many users. This is possible because users' screen names are displayed as text in the chat rooms or instant messaging services. Screen scrapers can use an automated process to scrape the communication screens every few minutes to get valid screen names in order to send spam to the holders of the screen names.

To block an automated process, one solution is to disable a program's recognition function by getting a living person involved in the process. For example, a program can recognize and process text information easily, but it is usually unable to recognize and process a message which is included in a graphic in a purposefully confusing manner unless a very powerful graphic recognition function is incorporated.

Image based human-recognition steps have been used in e-mail account registration processes. For every living person who has ever taken an online poll or signed up for free web-based e-mail, there are legions of computer-automated Internet robots trying to do the same thing. The automatically produced e-mail accounts are hard to block or trace, making them ideal vehicles for sending spam to legitimate e-mail users. Researchers at Carnegie Mellon University in Pittsburgh have created a security system, known as Gimpy, to thwart the automated process that relentlessly scour cyberspace for opportunities to register new e-mail addresses, stuff ballots for online polls and direct unwitting participants in Internet chat rooms to advertisement.

Gimpy is based on the human ability to read extremely distorted, squiggly, fuzzy or otherwise corrupted text, and the inability of current computer programs to do the same. Gimpy works by choosing a certain number of words from a dictionary, and then displaying them corrupted and distorted in an image. After that, Gimpy asks the user to type the words displayed in the image. While human users have no problem typing the words displayed, current computer programs, such as those based upon optical character recognition (OCR) technology, would be easily flustered if the text were not clear and free of background clutter.

Both Yahoo and MSN have implemented the Gimpy graphic recognition step in their new e-mail account registration process to prevent automated registration. Being usually at the very end of the registration process, the graphic recognition step requires the applicant to type a pass contained in an image into a form field. The pass is typically a randomly given word or combination of characters. FIG. 1 shows a part of MSN's registration screen which requires "Type the characters that you see in the picture". The characters are included in the image 101 in a distorted way to confuse graphic recognition application. If the entered text information 102 matches the correct text information of the pass, then the registration process continues; otherwise, the applicant is prompted to type it again. To enter the correct text information of the pass, the applicant must read and recognize the text information from the given image 101. Typing the pass from the image helps ensure that a person—not an automated program—is completing the registration form. This is important because attackers use harmful programs to try to register large numbers of accounts with Web services such as Yahoo and MSN. Attackers can use these accounts to cause problems for other users, such as sending junk e-mail messages or slowing down the service by repeatedly signing into multiple accounts simultaneously. In most cases, an automated registration program is unable to recognize the characters in the image. Without a living person's involvement, the registration process cannot be completed.

The purpose of this invention is to use a human's natural visual recognition and provide a solution to disable all automated screen scraping processes without having to get a living person's involvement.

SUMMARY OF THE INVENTION

In the preferred embodiment of the invention, an Internet based messaging system includes a plurality of logged-in users communicating with each other by displaying messages on a communication screen from which any of the logged-in users' screen identification and the displayed messages can be read by all users. The messaging system includes a mechanism for automatically converting a user's screen name into a graphic from which an ordinary person can recognize the user's screen name. The graphic is displayed on the communication screen whenever and wherever the user's screen name is displayed.

BRIEF DESCRIPTION OF THE DRAWINGS

FIG. 1 is a partial screen of MSN's e-mail registration process illustrating a step requesting the applicant type the characters contained in a given image to prevent automated registration;

DETAILED DESCRIPTION OF THE INVENTION

This invention provides a system and method for displaying graphical screen names (i.e. screen identifications) to prevent an automated process from scraping the displayed text information in an instant messaging service such as a chat room. The system first takes each logged-in user's text screen name and then uses the screen name to generate a graphic that can only be read by a human but cannot be screen-scraped by an automated process. The system also enables a user to add background wallpaper or other personal expression elements to the graphic.

Figure 2:
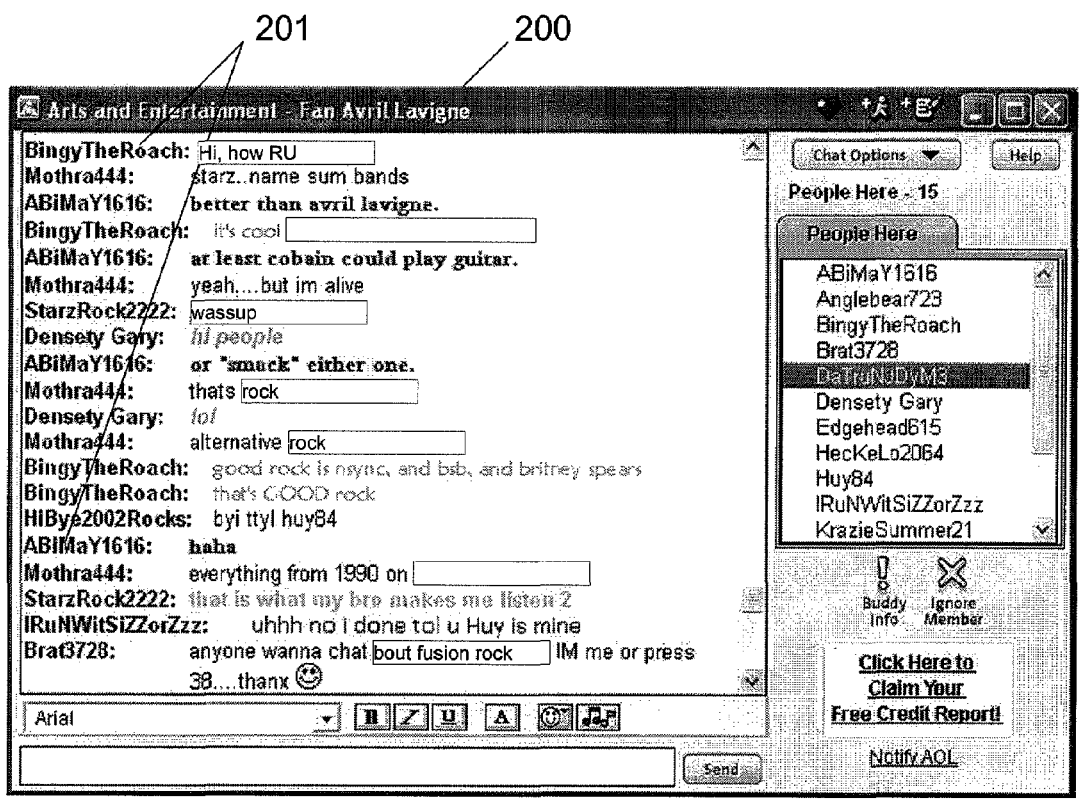
FIG. 2 is an exemplary chat room screen where the participants' screen names are displayed in text according to the current art.

FIG. 2 is an exemplary chat room screen 200 according to the current state of art where the logged-in users' screen names 201 are displayed as text. A user may choose the font, size, and other editing features for his screen name. For a screen scraper to get the logged-in users' e-mail addresses, it is not difficult to copy all textual information displayed in the message window and suffix "@aol.com" to each word or phrase ending with ":".

In the preferred embodiment of the invention, an Internet based messaging system includes a plurality of logged-in users communicating to each other by displaying their messages on a communication screen from which any of the users' screen name and the displayed messages can be read by all users. To accomplish the purpose of this invention, the messaging system includes at least a sub-system for automatically converting a user's screen name into a graphic from which an ordinary person can recognize the user's screen name. The graphic is displayed on the communication screen whenever and wherever the user's screen name is to be displayed.

This invention focuses on displaying screen names using graphics to prevent automated screen scrapers from working. There is no interactive part to the invention. A user may choose a style for his graphic screen name from a variety of predefined formats. The user may even customize his graphic screen name format by setting background image, font of characters for screen names, and font size. In addition, the user may choose to disable the automatic conversion function if he likes.

Figure 3:
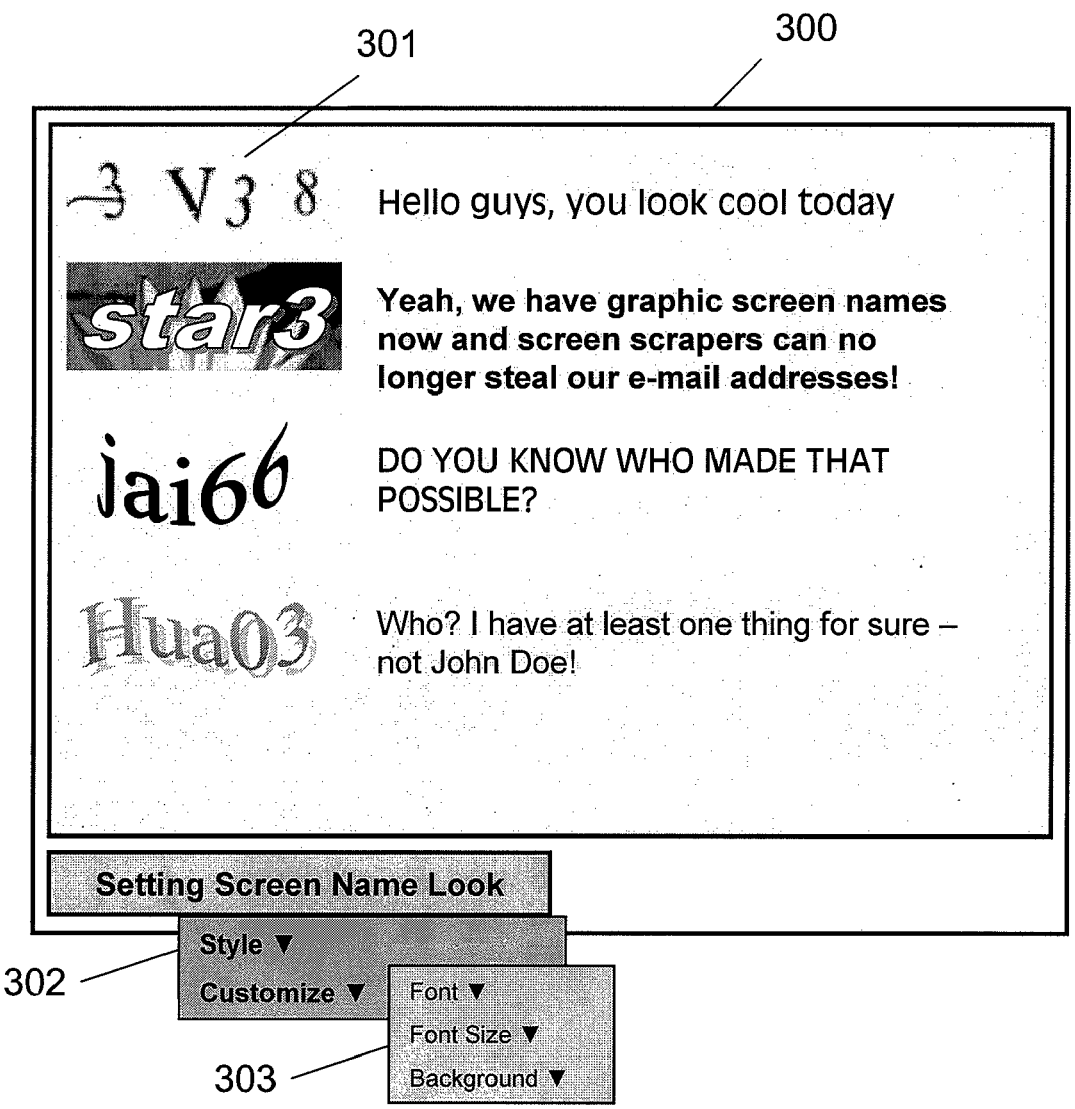
FIG. 3 is an exemplary chat room screen where the participants' screen names are displayed in stylized images to stop an automated process from extracting screen names from the displayed information according to the invention.

FIG. 3 is an exemplary chat room screen 300 where each user's screen name, such as 301, are displayed by a graphic. The overall graphic appearance can be selected from a drop down menu 302, from which the user can choose a style for the image from a variety of predefined formats. The user may further customize the style by setting various parameters such as style, font, background and other customizable features from the menu 303.

The graphic is a set of data representing a two-dimensional scene, that is composed of pixels arranged in a rectangular array with a certain height and width. Each pixel may consist of one or more bits of information, representing the brightness of the image at that point and including color information encoded as RGB triples.

Figure 4:
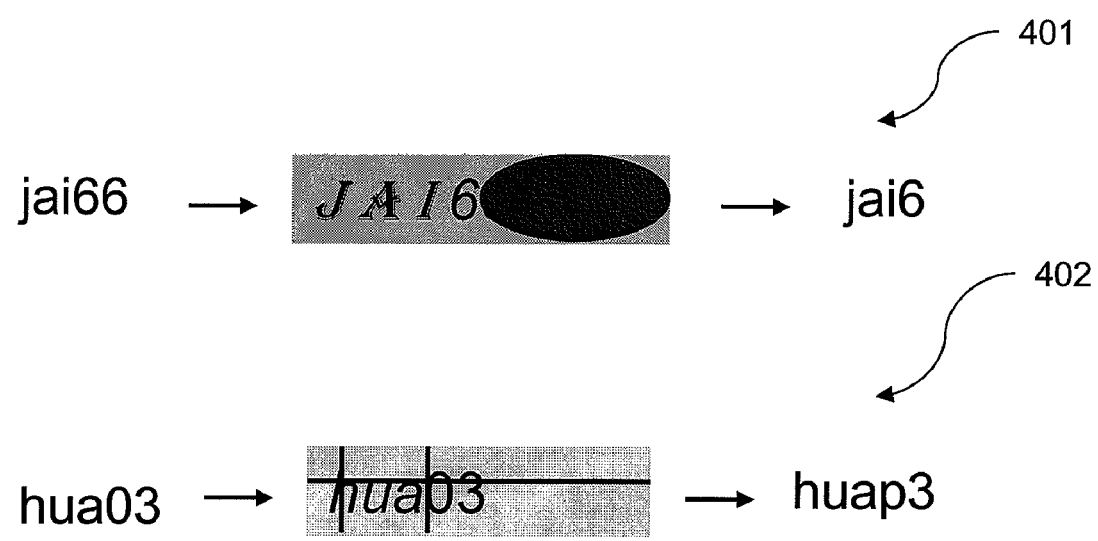
FIG. 4 is a schematic diagram illustrating two exemplary situations wherein a participant's screen name in a customized image appears different from the participant's real screen name.

Because an ordinary human reader should be able to recognize a user's graphic screen name without confusion, a mechanism, e.g. a graphics recognition system, may be added to the preferred embodiment to avoid ordinarily confusing visual situations. FIG. 4 is a schematic diagram illustrating two exemplary situations wherein a participant's screen name in a customized image appears different from the participant's real screen name. In the first situation 401, the last character of the screen name "JAI66" is merged into a red background and thus the screen name looks like "JAI6". In the second situation 402, because of the background line, the user name "hua03" looks like "huap3".

Figure 5:
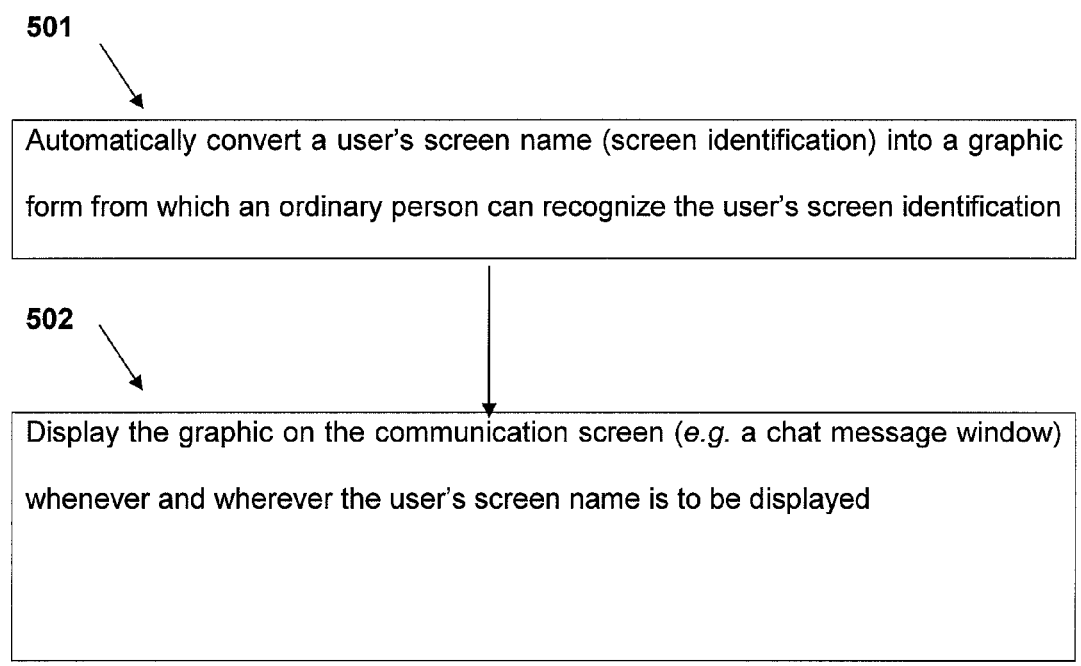
FIG. 5 is a flow diagram illustrating an automated process from extracting users' screen names from a communication screen wherein a number of users logged in an Internet based network communicate to each other by displaying messages according to the invention.

FIG. 5 is a flow diagram illustrating an automated process for extracting users' screen names from a communication screen wherein a number of users logged into an Internet based network communicate with each other by displaying messages.

The method includes the steps of:

Step 501: Automatically converting a user's screen name (screen identification) into a graphic form from which an ordinary person can recognize the user's screen identification; and Step 502: Displaying the graphic on the communication screen (e.g. a chat message window) whenever and wherever the user's screen name is to be displayed.

The solution described above can be used for any chat room or messaging system such as AOL's AIM window and Message Boards where the users do not want an automated process to discover what their screen names are.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. An apparatus for preventing screen scrapers from extracting user screen names, comprising:

an Internet based messaging system, with which a number of logged-in users communicate with each other by displaying messages on a communication screen from which any of the logged-in users' screen identifications and displayed messages can be read by the other users, a processor in communication with a memory, the processor executing code for:
preventing an automated process from extracting logged-in users' screen identification from said communication screen by automatically converting a logged in user's text screen identification into a human readable graphic form that cannot be screen-scraped by an automated process and from which a person can recognize the user's screen identification, said graphic form being displayed on said communication screen instead of said user's text screen identification whenever and wherever the user's screen identification is to be displayed.

2. The apparatus of claim 1, wherein the logged-in user may choose to disable said automatic conversion.

3. The apparatus of claim 1, further comprising:
means for setting a style of said graphic form.

4. The apparatus of claim 3, wherein the logged-in user may choose the style of said graphic form from a variety of predefined formats.

5. The apparatus of claim 3, wherein the logged-in user may customize a style for said graphic form by setting any of:
background image;
font of characters for screen identification; and
font size.

6. The apparatus of claim 5, further comprising:
means for preventing visual confusion caused by mixing any of said characters with said background image.

7. A method for preventing an automated process from extracting users' screen identifications from a communication screen, comprising:
a number of users logged into an Internet based network communicating with each other by displaying message;
preventing an automated process from extracting users' screen identifications from said communication screen by automatically converting a logged in user's text screen identification into a human readable graphic form that cannot be screen-scraped by an automated process and from which a person can recognize the user's screen identification; and
displaying said graphic form on said communication screen instead of said user's text screen identification whenever and wherever the user's screen identification is to be displayed.

8. The method of claim 7, wherein the logged-in user may choose to disable said automatic conversion.

9. The method of claim 7, further comprising the step of:
setting a style of said graphic form by the logged-in user.

10. The method of claim 9, wherein the logged-in user may choose a style of said graphic form from a variety of predefined formats.

11. The method of claim 9, wherein the logged-in user may customize the style for said graphic form by setting any of:
background image;
font of characters for screen identification; and
font size.

12. The method of claim 11, further comprising the step of:
setting parameters for preventing visual confusion caused by mixing any of said characters with said background image.

* * * * *

UNITED STATES PATENT AND TRADEMARK OFFICE
CERTIFICATE OF CORRECTION

| | |
|---|---|
| PATENT NO. | : 7,430,720 B2 |
| APPLICATION NO. | : 10/636461 |
| DATED | : September 30, 2008 |
| INVENTOR(S) | : Morgan Hua and Jai Rawat |

It is certified that error appears in the above-identified patent and that said Letters Patent is hereby corrected as shown below:

On the Title Page, Item (73) "America Online, Inc." should be changed to --AOL LLC--

Signed and Sealed this

Twenty-third Day of December, 2008

JON W. DUDAS
*Director of the United States Patent and Trademark Office*